United States Patent

[11] 3,589,039

[72] Inventor Albert H. Korenek
 13031 Buxley, Houston, Tex. 77045
[21] Appl. No. 810,690
[22] Filed Mar. 26, 1969
[45] Patented June 29, 1971

[54] METHOD OF AND APPARATUS FOR TEMPORARILY REMOVING A PORTION OF THE GROUND FROM AROUND A POLE BURIED IN THE GROUND
 6 Claims, 7 Drawing Figs.

[52] U.S. Cl................................................. 37/1,
 37/2, 37/195, 294/50.8, 175/244
[51] Int. Cl..................................................... E02f 5/00
[50] Field of Search........................................... 37/2 R,
 195, 1; 294/50.6—50.8; 175/244, 249, 257, 262;
 52/720; 111/92, 99; 47/8

[56] References Cited
UNITED STATES PATENTS
2,729,493 1/1956 Engel............................ 294/50.8

Primary Examiner—Edgar S. Burr
Attorney—Hyer, Eickenroht, Thompson & Turner

ABSTRACT: The apparatus disclosed includes two ground piercing blades mounted for positioning on opposite sides of a pole. The blades are arcuate in cross section and travel into the ground along converging paths. When forced into the ground as far as they will go the blades will combine with the pole to form a conically-shaped container in the shape of an inverted cone with the pole intersecting the apex of the cone. The blades are then raised out of the ground without relative movement between the blades so the blades continue to contain the ground that they have severed and to slide the ground up the pole leaving a cone shaped opening in the ground around the pole. After the exposed portion of the pole is inspected for rot and decay and treated for such, if necessary, the blades are lowered simultaneously back into the conically-shaped hole, sliding the ground contained therein along the pole, after which the blades are moved out of the ground along diverging paths leaving the ground previously severed to fill the hole around the pole.

Albert H. Korenek
INVENTOR

BY

ATTORNEYS

Albert H. Korenek
INVENTOR

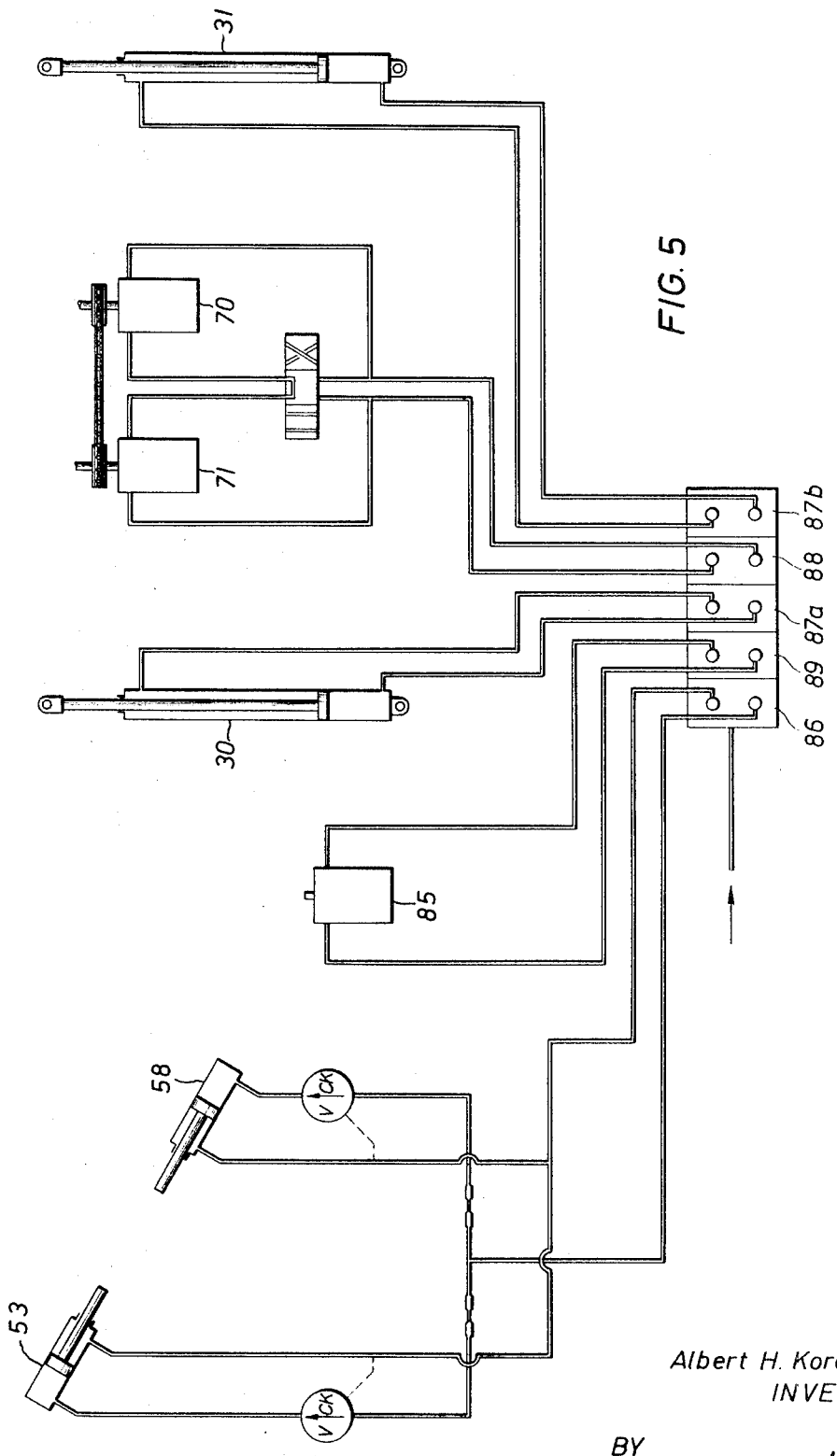

3,589,039

METHOD OF AND APPARATUS FOR TEMPORARILY REMOVING A PORTION OF THE GROUND FROM AROUND A POLE BURIED IN THE GROUND

This invention relates to a method of and apparatus for removing the dirt or ground from around a pole, such as a wooden utility pole, to expose that portion of the pole previously below the surface of the ground that is most susceptible to rot and decay due to ground water and air.

Wooden poles that are buried in the ground to support power and telephone lines, etc., usually are treated to withstand the elements to which they will be subjected. The portion of the pole subjected to the harshest and most severe deleterious conditions is that portion just below the surface of the ground. This is the zone just below ground level in which is contained both water and air in large quantities. This is referred to as the "ground line area." The water content of the ground line areas varies from time to time depending upon the rainfall, but in any event there will be many opportunities for both air and water to be present together adjacent this portion of the pole. The depth of this ground line area varies with the type of ground and the location of the pole, but usually it does not extend over about 2 feet below the surface of the ground. Below that, there is usually insufficient air to cause the wood to rot even though it is exposed to considerable water. In the ground line area, however, where both water and air are present in abundance, the wood tends to rot and decay rather rapidly even through it is treated to prevent this.

Due to this condition, it is the practice of the utility companies to periodically dig away the ground line area to expose that portion of the pole that is most likely to rot and decay to see how much life is left in the pole and whether or not the pole can be treated to further extend its life. The digging away of this dirt was previously done by hand and was the most time consuming and expensive portion of the operation.

It is an object of this invention to provide a method of and apparatus for quickly and efficiently removing a portion of the ground from around a pole to expose that portion of the pole most likely to rot and decay.

It is a further object of this invention to provide a method of and apparatus for removing the surface dirt or ground comprising the ground line area away from a pole with a minimum of disturbance to the adjacent ground and which returns the excavated ground to its position around the pole with a minimum amount of disturbance.

It is a further object of this invention to provide apparatus for excavating the ground line area away from a pole to permit inspection of that portion of the pole most likely to rot and decay wherein the pole supports the apparatus as well as the ground that is removed.

It is a further object of this invention to provide a method of and apparatus for excavating a conically shaped portion of the ground from around a pole and for sliding this excavated portion of ground up the pole while retaining it substantially in the same shape as the hole it left in the ground, and for returning the excavated ground portion into the hole it left after the pole has been inspected and treated as required.

It is an additional object of this invention to provide apparatus for excavating the ground line area from around the upper portion of a pole to expose that portion thereof that is most likely to decay and rot, which apparatus can be quickly and easily placed in position for such excavation and quickly and easily removed therefrom.

It is an additional and specific object of this invention to provide apparatus that will force ground piercing blades along converging paths into the ground to form a container in combination with the pole to confine the portion of the ground that is severed by the blades, that will slide the blades with the excavated ground portion up the pole exposing the portion of the pole that is most likely to rot and decay, and that will slide the blades and excavated ground back down the pole into the hole where the blades can be removed to restore the severed portion to the ground with a minimum of disturbance to the ground removed from the hole and the ground around the hole.

These and other objects, advantages, and features of this invention will be apparent to those skilled in the art from a consideration of this specification, including the attached drawings and appended claims.

The invention will now be described in connection with the attached drawings in which, FIG. 1 is a side view, partially in vertical section and partially in elevation, of the preferred embodiment of the apparatus of this invention;

Figure 1:
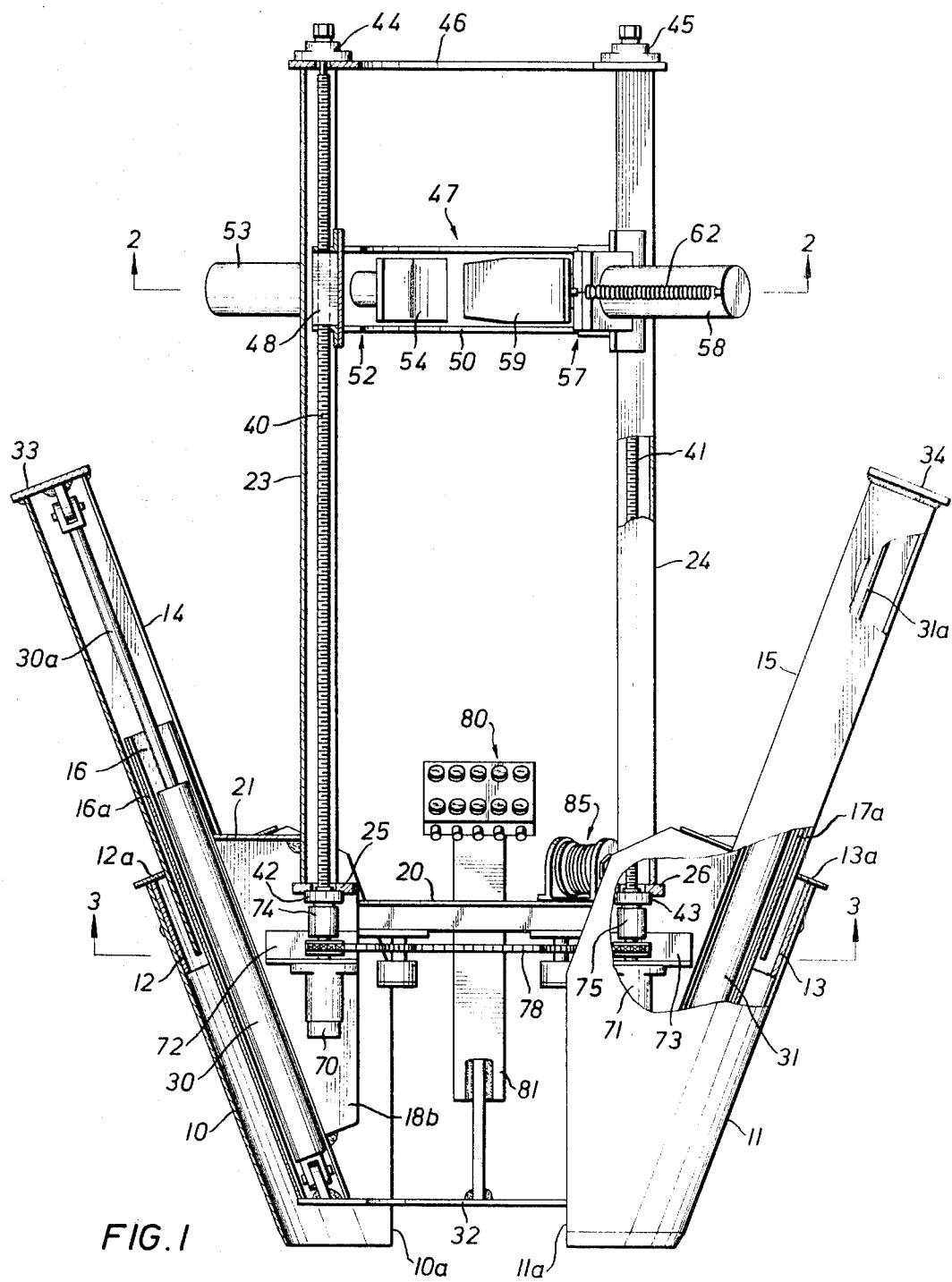
Figure 2:
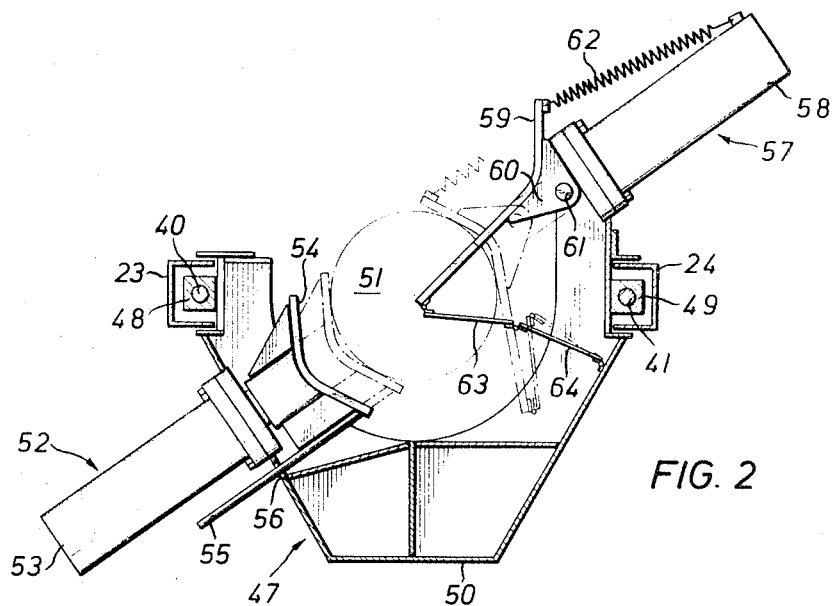
FIG. 2 is a cross section taken along line 2—2 of FIG. 1.
Figure 3:
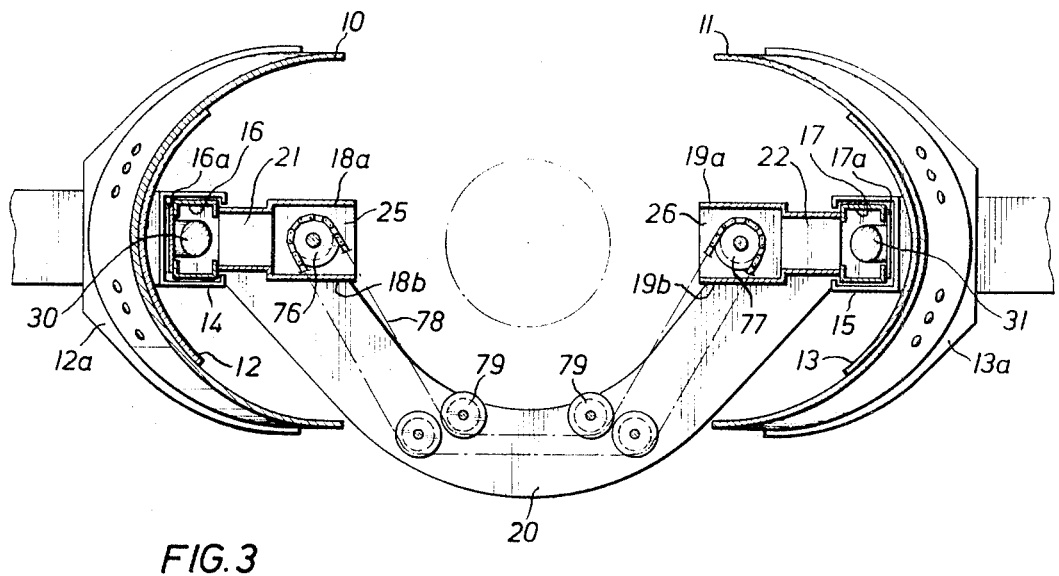
FIG. 3 is a cross section taken along line 3—3 of FIG. 1.
Figure 4C:
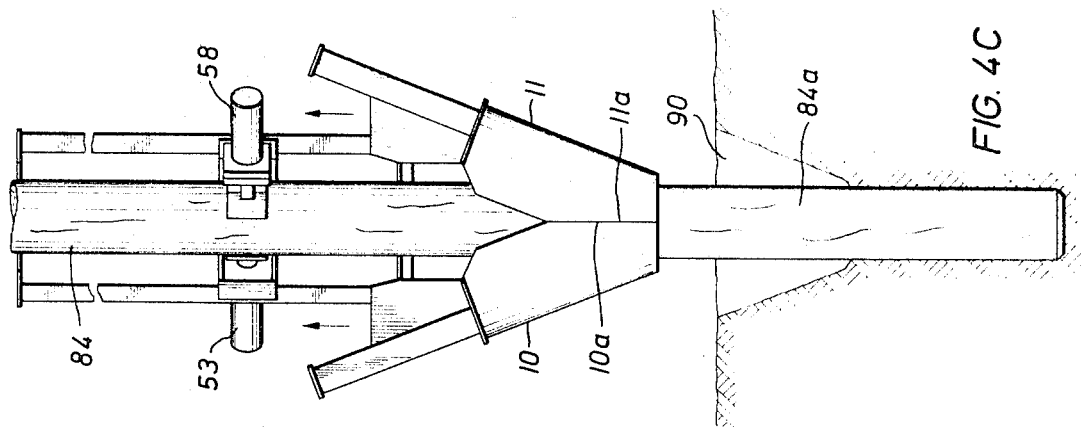
Figure 4B:
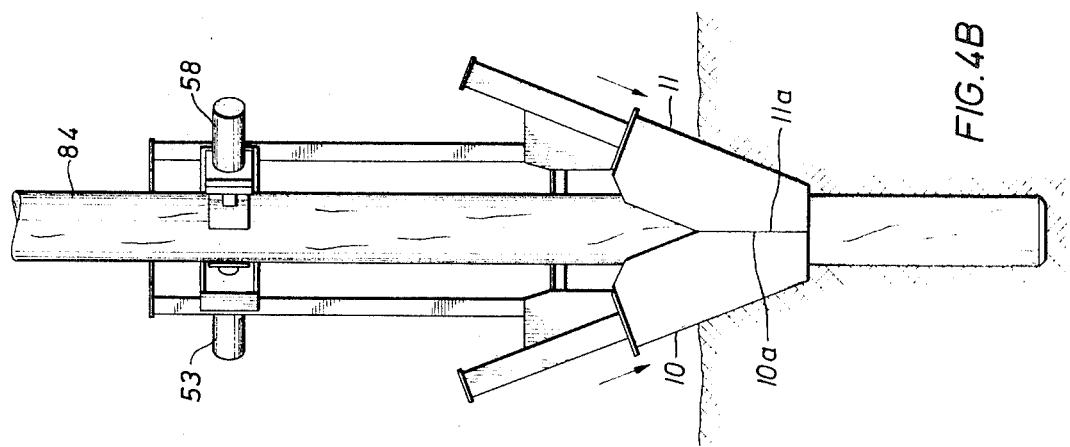
Figure 4A:
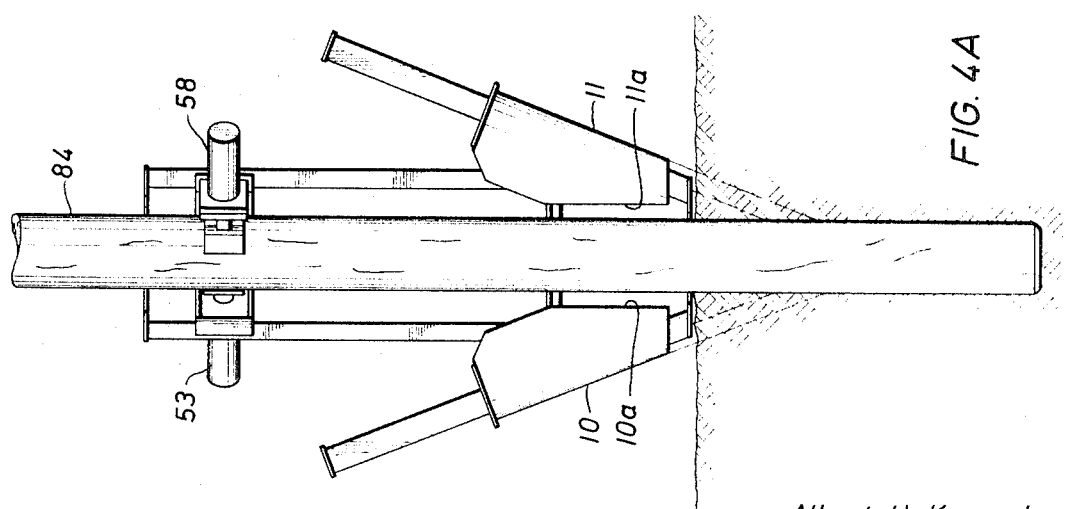

FIGS. 4A, 4B, and 4C are somewhat schematic views of the apparatus of FIG. 1 illustrating the steps in the novel method of this invention for excavating the ground line area from around a pole to expose that portion subject to rot and decay; and FIG. 5 is a schematic diagram of the hydraulic system employed to power the apparatus of FIGS. 1—4.

In the preferred embodiment shown, two ground piercing blades 10 and 11 are used to excavate around a pole. The blades are trough shaped in cross section, the ones shown being arcuate or circular in cross section, as best seen in FIG. 3.

Means are provided for mounting the blades for longitudinal movement into and out of the ground at an angle thereto along convergent paths that intersect each other and the longitudinal axis of the pole below the ground level. In the embodiment shown, blades 10 and 11 are supported by a blade guide assembly. This assembly comprises arcuate mounting plates 12 and 13, which are curved to conform to the curvature of the blades. The mounting plates are bolted to the inside of the blades, as shown in FIG. 3. The mounting plates, in turn, are connected to movable guide sleeves 14 and 15 by flanges 12a and 13a. The movable guide sleeves are rectangular in cross section and are hollow to receive stationary guide members 16 and 17, which are also rectangular in cross section, but smaller than the opening in movable guide sleeves 14 and 15. The stationary guide members comprise two pairs of spaced channels connected together by straps 16a and 17a, respectively (FIG. 3).

Movable guide members 14 and 15 are open on one side to permit the stationary guide members to be connected to spaced vertical mounting plates, i.e., stationary guide member 16 is connected to spaced mounting plates 18a and 18b whereas stationary guide member 17 is supported by mounting plates 19a and 19b. The two pairs of mounting plates are held in fixed relationship by C-shaped tie plate 20. They are held in spaced, parallel relationship by spacer plates 21 and 22, feed screw housings 23 and 24, and bearing support plates 25 and 26 about which more will be said later.

Stationary guide members 16 and 17 are inclined upwardly at the angle it is desired for blades 10 and 11 to be guided as they are forced into the ground. This angle plus the distance the blades are apart and their height above the ground determine how far into the ground they will travel before they converge. As the blades move into the ground, the movable guide members slide along the stationary guide members and force the blades to move along the desired path. As the blades are removed from the ground they will, in turn, be guided by these same members along upwardly directed diverging paths to the position shown in FIGS. 1 and 3.

Means are provided to force the blades into and out of the ground. In the embodiment shown, hydraulic cylinders 30 and 31 are located inside stationary guide members 16 and 17 for this purpose. The lower ends of the cylinders are connected to C-shaped plate 32, which is also connected to the lower end of the stationary guide members to help support them in the desired fixed relationship. Cylinder rods 30a and 31a are attached to movable guide members 14 and 15 by end plates 33 and 34, which are attached to the upper ends of the guide members. As hydraulic pressure pulls rods 30a and 31a into cylinders 30 and 31, movable guide members 14 and 15 will be pulled downwardly along stationary guide members 16 and 17 and in turn force plates 10 and 11 into the ground. Hydraulic pressure on the other side of the pistons in the cylinders will extend the rods and pull the blades out of the ground.

Means are provided to raise the ground piercing blades and blade guide assembly upwardly after the blades have been forced into the ground to raise the portion of the ground that is cut away by the blades upwardly out of the ground to leave a hole around the pole and expose the portion just below the ground for inspection. In the embodiment shown, threaded rods 40 and 41 have their lower ends rotatably mounted in thrust bearings 42 and 43, which are attached to the blade guide assembly through mounting plates 18a, 18b, 19a and 19b. The bearings are supported by bearing plates 25 and 26. The upper end of threaded rods or lead screws 40 and 41 are rotatably mounted in bearing assemblies 44 and 45, which are supported by C-shaped plate 46. Plate 46 is connected to bearing plates 25 and 26 by lead screw housings 23 and 24.

Connected to the lead screws intermediate their ends is pole clamp assembly 47. This assembly is supported by the threads on the lead screws through nuts 48 and 49. The nuts support clamp frame 50, which is semicircular in shape to provide opening 51 to receive the pole to be excavated. In FIG. 2, such a pole is shown dotted in position in opening 51 to have the excavating apparatus of this invention clamped to it.

Mounted on clamp frame 50 to engage one side of the pole is fixed clamp pad assembly 52. This assembly includes cylinder 53 and pad 54. The pad is mounted on the piston rod of cylinder 53 to be moved into and out of engagement with a pole, located in opening 51 of the clamp assembly. Pad 54 is contoured to approximate the radius of curvature of the average size pole with which the apparatus is to be employed. To keep pad 54 oriented with respect to the poles, so that the curved portion of the pad will always engage the curved portion of the pole, rod 55 is connected to the pad and extends through opening 56 in clamp frame 50. This rod keeps the pad and rod from rotating, which they could do otherwise, since the piston (not shown) in cylinder 53 is free to rotate.

Pivoted clamp pad assembly 57 is mounted on clamp frame 50 diametrically opposite fixed clamp assembly 52. This pad assembly includes hydraulic cylinder 58 and clamp pad 59. This clamp pad is also contoured to conform to the average radius of curvature of the poles with which the apparatus is to be employed. It is pivotally attached to the piston rod of hydraulic cylinder 58 by clevis 60 and pivot pin 61. This permits pad 59 to pivot from the position shown in solid lines in FIG. 2 to the position shown in dotted lines, when the clamp is in engagement with a pole. Coil spring 62 resiliently urges pad 59 to the solid line position shown.

When the apparatus is moved into position to be clamped to a pole to be excavated, the pole as it moves in opening 51 will engage pad 59 and pivot it counterclockwise, as shown in FIG. 2, toward the dotted line position against the force of spring 62. To keep this pad from rotating with the piston rod and piston of hydraulic cylinder assembly 58, two plates 63 and 64 are hinged to each other and to pad 59 and clamp frame 50, as shown in FIG. 2. These plates form a linkage that will keep pad 59 from rotating, but which will permit the pad to pivot between the two positions shown in FIG. 2, as a pole is moved into and out of position between the clamp pads.

When the apparatus is moved into position to excavate a portion of the ground from around a pole, the pole is positioned in opening 51 and hydraulic cylinder assemblies 53 and 58 are actuated to move the pads into firm engagement with the pole. The weight of the apparatus can now be transferred to the pole. The apparatus is positioned above the ground to expose the pole the desired distance below the ground. Once clamped to the pole some adjustment of this distance is possible by rotating lead screws 40 and 41, which will cause the ground piercing blades and their guide assembly to move up and down relative to the pole and the ground as will be fully described below.

Means are provided to move the blades, etc., relative to the clamp. In the embodiment shown, hydraulic motors 70 and 71 are mounted on support plates 72 and 73 between the two pairs of mounting plates 18a and 18b and 19a and 19b, respectively. The output shafts of these motors are connected to lead screws 40 and 41 by couplings 74 and 75.

It is necessary for the lead screws to be rotated at substantially the same speed, otherwise one will move faster than the other. This will cause misalignment of the lead screws and the nuts and make rotation of the rods very difficult if not impossible. Therefore, means are provided to insure that lead screws 40 and 41 rotate at the same speed. In the embodiment shown, the output shafts of motors 70 and 71 not only drive the lead screws, but they also drive sprockets 76 and 77, as best seen in FIG. 3. Roller chain 78 is in engagement with both sprockets and is driven thereby. To get the chain around the pole that will be extending between sprockets 76 and 77, idler sprockets 79 are mounted on plate 20, as shown in FIG. 3, to lead the chain around the pole, shown dotted in FIG. 3. With this arrangement, neither motor can rotate at a speed different from the other since for each revolution of the output shaft of one of the motors the output shaft of the other motor must make one revolution because they are both driving chain 78. This arrangement is particularly important when using hydraulic motors, as is done in the preferred embodiment, since the speed of the motors varies with the load.

The valves that control the motors and cylinders used on this apparatus are mounted in side-by-side relationship as valve bank 80. For the convenience of the operator of this equipment, the valve bank is supported by pedestal 81 and plate 32.

How the apparatus described above performs the method of this invention is best seen in FIGS. 4A, 4B, and 4C. In FIG. 4A, the apparatus has been moved into position around pole 84. Usually, the apparatus is supported by a crane mounted on the back of a truck or similar vehicle. For this reason, it is advantageous to provide winch 85, as seen in FIG. 1, to help position the apparatus relative to the pole before the clamps are actuated. Thus, the line from winch 85 can be attached to the pole and the winch can be used to pull the apparatus into position with the blades on opposite sides of the pole, as shown in FIG. 4A. The flow of hydraulic fluid to the winch is controlled by valve 89 (FIG. 5). When the apparatus is so positioned, and also the desired distance above the ground, hydraulic cylinders 53 and 58 are actuated by valve 86 as shown in FIG. 5. This moves clamp pads 54 and 59 into firm engagement with the pole. The weight of the apparatus can now be transferred to the pole from the crane (not shown) that had been supporting it. Hydraulic fluid is supplied to cylinders 30 and 31 through valves 87a and 87b to force ground piercing blades 10 and 11 to travel longitudinally along the converging inclined paths shown in dotted lines in FIG. 4A. The paths of these blades intersect approximately the longitudinal axis of pole 84.

As the blades come together, ideally, vertical sides 10a and 11a engage and the lower ends 10b and 11b engage the pole and form a closed container for the portion of the ground confined therein. Since the diameter of the poles vary, however, the sides of the blades will often engage before the ends engage the pole and vice versa. Therefore, the blades are designed for the average diameter of pole to be excavated and the gaps between the sides or between the ends of the blades and the pole are kept to a minimum. Usually, the resulting gaps will allow little if any dirt to fall through it and even if some dirt is lost it will not be enough to interfere with the inspection of the pole.

After the blades have pierced the ground and formed the closed container with the pole, as shown in FIG. 4B, hydraulic fluid is supplied to motors 70 and 71 through valve 88. The motors rotate lead screws 40 and 41 relative to nuts 48 and 49 and the blades and the dirt confined therein are moved up the pole, the blades and the dirt sliding along the pole, to the position shown in FIG. 4C. This will leave hole 90, which is generally the shape of an inverted cone.

The hole exposes portion 84a of the pole for inspection and treatment, if the inspection indicates that treatment is desired. In some cases, inspection will indicate that the pole must be replaced and, therefore, no treatment will be given the pole. In other cases, the pole may not have suffered rot or decay to the extent that treatment is necessary.

After one of these decisions is made and the treatment, if any, is applied to the pole, hydraulic motors 70 and 71 are reversed by changing the position of valve 88. The lead screws are rotated in the opposite direction and the blades with the dirt they contain will slide back down the pole into hole 90 as shown in FIG. 4B. Next hydraulic cylinders 30 and 31 will be actuated to retract blades 10 and 11 out of the ground to return the apparatus to the condition shown in FIG. 4A, leaving the dirt previously severed from the ground to fill conically shaped hole 90.

To remove the apparatus from the pole, the crane used to move the apparatus from pole to pole picks up the weight of the apparatus and clamp assembly 47 is released. The apparatus can now be removed from the pole and moved to excavate the ground from around another pole.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what I claim is:

1. A method of excavating the ground from around a pole that is buried in the ground to expose for inspection and treatment the portion of the pole below the ground level that is most subject to rot and decay and for replacing the ground so excavated after the pole has been inspected and treated as required, said method comprising the steps of severing a portion of the ground from around a pole, confining the severed portion of the ground, sliding the severed portion of the ground up the pole while retaining the ground portion in the same general shape as the hole it leaves to expose the portion of the pole below the ground level that is most subject to rot and decay, and lowering the severed portion of the ground back into the hole it left after the exposed portion of the pole has been inspected and given the required treatment.

2. A method of excavating the ground from around a pole that is buried in the ground to expose for inspection and treatment the portion of the pole below the ground level that is most subject to rot and decay and for replacing the ground so excavated after the pole has been inspected and treated as required, said method comprising the steps of severing an inverted conelike portion of the ground from around a pole with the pole intersecting the apex of said conically-shaped portion, sliding the severed portion of the ground up the pole while retaining the ground in said conical shape to leave a conically-shaped hole and expose the portion of the pole below the ground level that is most subject to rot and decay, and lowering the severed portion of the ground back into the conically-shaped hole after the exposed portion of the pole has been inspected and given the required treatment.

3. A method of excavating the ground from around a pole that is buried in the ground to expose for inspection and treatment the portion of the pole below the ground level that is most subject to rot and decay and for replacing the ground so excavated after the pole has been inspected and treated as required, said method comprising the steps of severing an inverted conelike portion of the ground from around a pole with the pole intersecting the apex of said conically shaped portion; confining the severed portion of the ground; sliding the severed portion of the ground up the pole to leave a conelike hole in the ground that exposes the portion of the pole below the ground level that is most subject to rot and decay; lowering the severed portion of the ground back into the conically shaped hole after the exposed portion of the pole has been inspected and given the required treatment, and releasing the severed portion of the ground from its confinement to permit it to again fill the space around the pole.

4. Apparatus for excavating ground from around a pole that is buried in the ground to expose for inspection and treatment the portion of the pole below the ground level that is most subject to rot and decay and for replacing the ground so excavated after the pole has been inspected and treated as required, said apparatus comprising, a plurality of ground piercing blades generally trough shaped in transverse cross section, means mounting the blades for longitudinal movement into and out of the ground at an angle thereto along convergent paths that intersect each other and the longitudinal axis of the pole below the ground level, said blades being shaped to combine with the pole at the end of their travel along convergent paths and form an inverted, conelike container having an opening at its apex through which the pole extends, means for moving the blades into the ground to sever an inverted conelike portion of the ground surrounding the pole, and to form said container for confining the ground portion, means for raising the blades while forming said container to slide the severed portion of the ground upward along the pole to leave a conelike hole around the pole exposing for inspection and treatment the portion of the pole adjacent the ground level and for lowering the blades back into the hole to return the severed portion of the ground back into the hole after the inspection and treatment is completed, and means for moving the blades longitudinally along divergent paths out of the ground leaving the severed portion of the ground to fill the hole.

5. The apparatus of claim 4 in which two ground piercing blades are provided, said blades being arcuate in cross section and mounted on the mounting means for positioning on opposite sides of a pole.

6. The apparatus of claim 4 in which said blade raising and lowering means includes a vertically mounted lead screw associated with each blade, means rotatably connecting the lower end of each of said lead screws to its associated blade mounting means, clamp means for attaching the excavating apparatus to a pole, nut means connected to the clamp means and threadedly engaging said lead screws, and means for rotating the lead screws to the same speed to move the lead screws through the nut means at the same speed to raise and lower the ground piercing blades with substantially no relative movement between the blades.